(12) United States Patent
Komatsu

(10) Patent No.: US 9,036,388 B2
(45) Date of Patent: May 19, 2015

(54) SEMICONDUCTOR DEVICE

(75) Inventor: Kousuke Komatsu, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 570 days.

(21) Appl. No.: 13/043,885

(22) Filed: Mar. 9, 2011

(65) Prior Publication Data

US 2011/0222325 A1 Sep. 15, 2011

(30) Foreign Application Priority Data

Mar. 15, 2010 (JP) ................................. 2010-058068

(51) Int. Cl.
*H02M 7/537* (2006.01)
*H02M 7/487* (2007.01)
*H02M 7/00* (2006.01)

(52) U.S. Cl.
CPC .............. *H02M 7/487* (2013.01); *H02M 7/003* (2013.01)

(58) Field of Classification Search
CPC ... H02M 7/003; H02M 7/537; Y02B 70/1441
USPC .................. 363/127–137; 323/282
See application file for complete search history.

(56) References Cited

U.S. PATENT DOCUMENTS 5,896,286 A * 4/1999 Terasawa ....................... 363/132
6,064,578 A * 5/2000 Hashimoto et al. .............. 363/16
6,930,899 B2 * 8/2005 Bakran et al. .................. 363/132
8,300,443 B2 * 10/2012 Takizawa ...................... 363/147
2009/0003024 A1 1/2009 Knaup

FOREIGN PATENT DOCUMENTS

| JP | 2002247862 A | * | 8/2002 | ............. H02M 7/48 |
| JP | 2003-333826 | | 11/2003 | |
| JP | 2008-193779 | | 8/2008 | |

OTHER PUBLICATIONS

Inarida et al. Power Converter; (JP 2002247862 (A); Aug. 30, 2002.*
English Translation of Japanese Office Action mailed Oct. 8, 2013 in corresponding Japanese Application No. 2010-058068.

* cited by examiner

*Primary Examiner* — Adolf Berhane
*Assistant Examiner* — Yemane Mehari

(57) ABSTRACT

A semiconductor device of a three-level inverter circuit with a reduced number of power supplies for driving IGBTs. The semiconductor device includes a series-connected circuit of IGBTs between P and N of a DC power supply and an AC switch element that is connected between a series connection point of the series-connected circuit and a neutral point of the DC power supply. The series-connected circuit and the AC switch element are integrated into one module. The AC switch element is formed by connecting a collector of a first IGBT to which a diode is connected in reverse parallel and a collector of a second IGBT to which a diode is connected in reverse parallel, and an intermediate terminal is provided at a connection point between the collectors.

22 Claims, 7 Drawing Sheets

OUTWARD APPEARANCE OF MODULE

CIRCUIT STRUCTURE

US 9,036,388 B2

SEMICONDUCTOR DEVICE

CROSS-REFERENCE TO RELATED APPLICATIONS

This application claims the priority benefit of Japanese Patent Application No. 2010-058068, filed on Mar. 15, 2010, in the Japanese Intellectual Property Office, the disclosure of which is incorporated herein by reference.

BACKGROUND

1. Field

The present invention relates to a semiconductor device of a three-level power conversion circuit that is used for a three-level inverter or a resonant inverter.

2. Description of the Related Art

FIG. 4 shows an example of a circuit of a three-level three-phase inverter that converts a direct current (DC) into an alternating current (AC) according to the related art. DC power supplies 1 and 2 are connected in series in which a positive potential is P, a negative potential is N, and a neutral potential is M. In general, a DC power supply configured as an AC power supply system can be realized by using a structure in which a diode rectifier (not shown) is used to full-wave rectify the alternating current and a large-capacity electrolytic capacitor is used to smooth the rectified current.

Series-connected circuits corresponding to three phases, which are configured by connecting IGBTs (to which diodes are connected in reverse parallel in series), are connected between the positive potential P and the negative potential N. That is, a series-connected circuit 60 for a U phase is configured by connecting an upper arm including an IGBT 11 and a diode 12 connected in reverse parallel to the IGBT 11 and a lower arm including an IGBT 13 and a diode 14 connected in reverse parallel to the IGBT 13 in series. A series-connected circuit 61 for a V phase is configured by connecting an upper arm including an IGBT 21 and a diode 22 connected in reverse parallel to the IGBT 21 and a lower arm including an IGBT 23 and a diode 24 connected in reverse parallel to the IGBT 23 in series. A series-connected circuit 62 for a W phase is configured by connecting an upper arm including an IGBT 31 and a diode 32 connected in reverse parallel to the IGBT 31 and a lower arm including an IGBT 33 and a diode 34 connected in reverse parallel to the IGBT 33 in series.

An AC switch configured by connecting IGBTs (to which diodes are connected in reverse parallel) in series is connected between a series connection point between the upper arm and the lower arm of the series-connected circuit for each phase and a DC neutral potential M. That is, an AC switch circuit in which the emitter of a semiconductor device 63 (including an IGBT 81 and a diode 82 connected in reverse parallel to the IGBT 81) is connected to the emitter of a semiconductor device 64 (including an IGBT 83 and a diode 84 connected in reverse parallel to the IGBT 83), and devices 63 and 64 are connected between the series connection point of the series-connected circuit 60 for the U phase and the neutral point M of the DC power supply. In addition, an AC switch circuit in which the emitter of a semiconductor device 65 (including an IGBT 85 and a diode 86 connected in reverse parallel to the IGBT 85) is connected to the emitter of a semiconductor device 66 (including an IGBT 87 and a diode 88 connected in reverse parallel to the IGBT 87), and devices 65 and 66 are connected between the series connection point of the series-connected circuit 61 for the V phase and the neutral point M of the DC power supply. An AC switch circuit in which the emitter of a semiconductor device 67 (including an IGBT 89 and a diode 90 connected in reverse parallel to the IGBT 89) is connected to the emitter of a semiconductor device 68 (including an IGBT 91 and a diode 92 connected in reverse parallel to the IGBT 91), and devices 67 and 68 are connected between the series connection point of the series-connected circuit 62 for the W phase and the neutral point M of the DC power supply. The series connection points of the series-connected circuits 60, 61, and 62 are AC outputs of the U phase, the V phase, and the W phase and are connected to a load 74 through reactors 71, 72, and 73, each serving as a filter.

In the three-phase circuit structure, the series connection points of the series-connected circuits 60, 61, and 62 can output the positive potential P, the negative potential N, and the neutral potential M, respectively. Therefore, a three-level inverter output is obtained. The three-phase circuit structure is characterized in that it outputs an AC voltage with three voltage levels and fewer harmonic components, as compared to a two-level inverter. It is possible to reduce the sizes of the output filters 71 to 73.

Semiconductor devices in which the circuits corresponding to three phases shown in FIG. 4 are integrated into one module and semiconductor devices in which a circuit corresponding to one phase is integrated into one module have been manufactured. When a circuit corresponding to one phase is integrated into a module to form a semiconductor device, the semiconductor device can be used for a single phase. In addition, a plurality of semiconductor devices may be used to form the three-phase inverter shown in FIG. 4. FIGS. 5A and 5B show a semiconductor device including the circuit corresponding to one phase shown in FIG. 4. FIG. 5A shows the outward appearance of a semiconductor module and FIG. 5B shows the internal circuit structure. The semiconductor module includes as semiconductor elements IGBTs 11 and 13, diodes 12 and 14, and an AC switch 15. A terminal 17 is a C1 terminal that is connected to the positive potential P of the DC power supply. A terminal 18 is an M terminal that is connected to the neutral potential M of the DC power supply. A terminal 19 is an E2 terminal that is connected to the negative potential N of the DC power supply. A terminal 16 is an E1C2 terminal that is connected to a load. FIG. 5A shows a metal base substrate 3 allowing a semiconductor element or a wiring member to be provided thereon so as to be insulated, and an insulating case 4 of the module. The base substrate 3 also has a function of transferring heat generated from the inside of the module to a cooling fan. Any of the following substrates, for example, may be used as the base substrate 3: an aluminum insulating substrate having an insulating layer formed on an aluminum plate; and a substrate in which, for example, an alumina or aluminum nitride ceramic substrate having metal foil, such as copper foil, bonded thereto is mounted on a copper or alloy plate. In recent years, a ceramic substrate that has metal foil bonded thereto without a copper or alloy plate has been used as the base substrate 3. In all of the substrates, metal is exposed from the rear surface of the base substrate 3 and the semiconductor elements provided in the insulating case 4 are insulated from the metal by an insulator. In FIG. 5A, the terminals C1, M, and E2 are arranged in a line on the module. FIGS. 6A to 6C show examples of the structure of the AC switch 15 used in FIG. 5B. In the examples shown in FIGS. 6A and 6B, since a general IGBT has very low reverse blocking voltage capability, the IGBT and the diode are connected in series to ensure reverse voltage resistance. FIG. 6A shows the circuit structure of an AC switch formed by connecting the emitter of an IGBT 41 to which a diode 43 is connected in reverse parallel and the emitter of an IGBT 42 to which a diode 44 is connected in reverse parallel. When a current flows from a terminal K to a terminal L, the IGBT 41 is turned on and the current flows through a path from the IGBT 41 to the diode 44. When a current flows from the terminal L to the terminal K, the IGBT 42 is turned on and the current flows through a path from the IGBT 42 to the diode 43.

FIG. 6B shows the circuit structure of an AC switch formed by connecting the collector of the IGBT 41 to which the diode 43 is connected in reverse parallel and the collector of the IGBT 42 to which the diode 44 is connected in reverse parallel. When a current flows from the terminal K to the terminal L, the IGBT 42 is turned on and the current flows through a path from the diode 43 to the IGBT 42. When a current flows from the terminal L to the terminal K, the IGBT 41 is turned on and the current flows through a path from the diode 44 to the IGBT 41.

FIG. 6C shows the structure of an AC switch formed by connecting reverse-blocking IGBTs 45 and 46, which are IGBTs having reverse blocking voltage capability, in reverse parallel to each other. When a current flows from the terminal K to the terminal L, the reverse-blocking IGBT 45 turns on. When a current flows from the terminal L to the terminal K, the reverse-blocking IGBT 46 turns on (For example, see JP-A-2008-193779).

A circuit having the IGBTs connected in reverse parallel to each other or a circuit having the reverse-blocking IGBTs connected in reverse parallel to each other is given as an example of the AC switch. However, a combination of a diode bridge circuit and IGBTs or other kinds of semiconductor switching elements may be used.

The circuit structure shown in FIGS. 5A and 5B using the AC switch shown in FIG. 6A in which the emitters of the IGBTs are connected to each other as the AC switch 15 requires a total of four driving power supplies, that is, two driving power supplies for driving the IGBT 11 and the IGBT 13 and two driving power supplies for driving the IGBT 41 and the IGBT 42.

In the circuit structure shown in FIGS. 5A and 5B using the AC switch shown in FIG. 6B in which the collectors of the IGBTs are connected to each other as the AC switch 15, the emitter of the IGBT 11 is connected to the emitter of the IGBT 42 and the emitter potentials are equal to each other. Therefore, the IGBT 11 and the IGBT 42 can share a driving power supply, and the number of driving power supplies for driving the IGBTs can be reduced to three, that is, one driving power supply for driving the IGBT 11 and the IGBT 42 and two driving power supplies for driving the IGBT 13 and the IGBT 41. Since the number of driving power supplies is reduced, it is possible to reduce the size and cost of an inverter.

However, in the circuit structure shown in FIGS. 5A and 5B using the AC switch shown in FIG. 6B in which the collectors of the IGBTs are connected to each other as the AC switch 15, the number of driving power supplies is reduced, but the AC switch 15 has the following problems.

That is, in the case of a semiconductor device in which the circuits corresponding to three phases shown in FIG. 4 are integrated into one module or a semiconductor device in which a circuit corresponding to one phase is integrated into one module, the insulation test of such semiconductor is performed upon completion of the manufacture. In the insulation test, main terminals of the module and other terminals, such as control terminals, protruding to the outside of the module are connected to one terminal of an AC power supply, and metal exposed from the rear surface of the base substrate 3 is connected to the other terminal of the AC power supply. Then, for example, a voltage of 3.0 kV is applied to check electrical insulation between the semiconductor element in the module and the metal on the rear surface of the base substrate 3. The insulation test will be described with reference to FIGS. 7A and 7B. FIGS. 7A and 7B show an example in which a ceramic substrate 7 on a copper base 8 is used as a base substrate. As shown in FIG. 7A, when an AC power supply 9 supplies a current I and a positive voltage is applied to the terminal, charge is stored between a circuit pattern (not shown) on the ceramic substrate 7 (represented by a dotted line) and the copper base 8 on the rear surface of the ceramic substrate 7. In this case, the following three charges are stored between the circuit pattern of the ceramic substrate 7 and the copper base 8 in the AC switch: a charge $Q_1$ that is stored by a charging current $I_{11}$, part of a current $I_1$, in a capacitive component $C_1$ between the emitter of the IGBT 41 and the copper base; a charge $Q_2$ that is stored by a charging current $I_{21}$, part of a current $I_2$, in a capacitive component $C_2$ between the emitter of the IGBT 42 and the copper base; and a charge $Q_3$ that is stored in a capacitive component $C_3$ between the cathode and the copper base by a charging current $I_3+I_4$ obtained by a current $I_3$ flowing across the diode 43 and a current $I_4$ flowing across the diode 44.

Then, as shown in FIG. 7B, when the voltage applied from the AC power supply 9 is reduced, the charge stored in the ceramic substrate 7 is discharged. At that time, the discharging currents $I_{11}$ and $I_{21}$ that are generated by the charges $Q_1$ and $Q_2$ stored in the capacitive components $C_1$ and $C_2$ between the emitters of the IGBTs 41 and 42 and the copper base, flow to the AC power supply. However, the discharging current $I_3+I_4$ that is generated by the charge $Q_3$ stored in the capacitive component $C_3$ between the collector and the copper base, is prevented from flowing by the diode and remains without being discharged. Therefore, there is a large potential difference between the collector and the emitter of the IGBTs 41 and 42 due to the charge $Q_3$ remaining in the capacitive element $C_3$ between the collector and the copper base. Therefore the IGBTs 41 and 42 are likely to be damaged.

In the AC switch shown in FIGS. 7A and 7B, since the collector is shared between the IGBT 41 and the IGBT 42, auxiliary emitters 6c and 6d are provided at both ends of the AC switch. Therefore, when the auxiliary emitters 6c and 6d are also used to evaluate an individual element, the overall characteristics of the IGBTs and the diodes, such as the IGBT 41 and the diode 44, and the IGBT 42 and the diode 43, are measured. Therefore, it is difficult to evaluate the individual element.

SUMMARY

The invention has been made in order to solve the above-mentioned problems of the related art. An object of the invention is to prevent damage to a semiconductor device during the insulation test and individually evaluate elements in the semiconductor device.

In order to solve the above-mentioned problems and achieve the object, according to a first aspect of the invention, there is provided a semiconductor device that is applied to a three-level voltage-type inverter. The semiconductor device includes (1) a first IGBT to which a diode is connected in reverse parallel and which has a collector connected to a positive terminal of a DC circuit, (2) a second IGBT to which a diode is connected in reverse parallel and which has an emitter connected to a negative terminal of the DC circuit, and (3) an AC switch that is connected between a connection point between an emitter of the first IGBT and a collector of the second IGBT and a neutral terminal between the positive terminal and the negative terminal of the DC circuit. The first IGBT, the second IGBT, and the AC switch are accommodated in one package. The AC switch is formed by connecting a collector of a third IGBT to which a diode is connected in reverse parallel and a collector of a fourth IGBT to which a diode is connected in reverse parallel. An intermediate terminal is provided between the collector of the third IGBT and the collector of the fourth IGBT.

According to a second aspect of the invention, in the semiconductor device according to the first aspect, the first to fourth IGBTs, each having a diode connected in reverse parallel thereto, may form a switching circuit corresponding to one phase, and a plurality of switching circuits each corresponding to one phase may be accommodated in one package.

According to a third aspect of the invention, in the semiconductor device according to the first or second aspect, the first to fourth IGBTs may have terminals of auxiliary emitters.

According to a fourth aspect of the invention, in the semiconductor device according to the third aspect, among the first to fourth IGBTs, the IGBTs having the emitters at the same potential may share the terminal of the auxiliary emitter.

According to a fifth aspect of the invention, in the semiconductor device according to any one of the first to fourth aspects, the collector of the first IGBT, the emitter of the second IGBT, and the neutral terminal may be main terminals, and the intermediate terminal and the gates and the auxiliary emitters of the first to fourth IGBTs may be terminals smaller than the main terminals.

According to a sixth aspect of the invention, in the semiconductor device according to the fifth aspect, the intermediate terminal may be disposed below the main terminals and the terminal of the gates and the auxiliary emitters.

According to the semiconductor device of the above-mentioned aspects of the invention, it is possible to prevent the damage to a semiconductor device during the insulation test and individually evaluate elements in the semiconductor device.

BRIEF DESCRIPTION OF THE DRAWINGS

FIG. 5A is a perspective view illustrating the outward appearance of the semiconductor device and FIG. 5B is a circuit diagram illustrating the semiconductor device;

DESCRIPTION OF EMBODIMENTS

Figure 1:
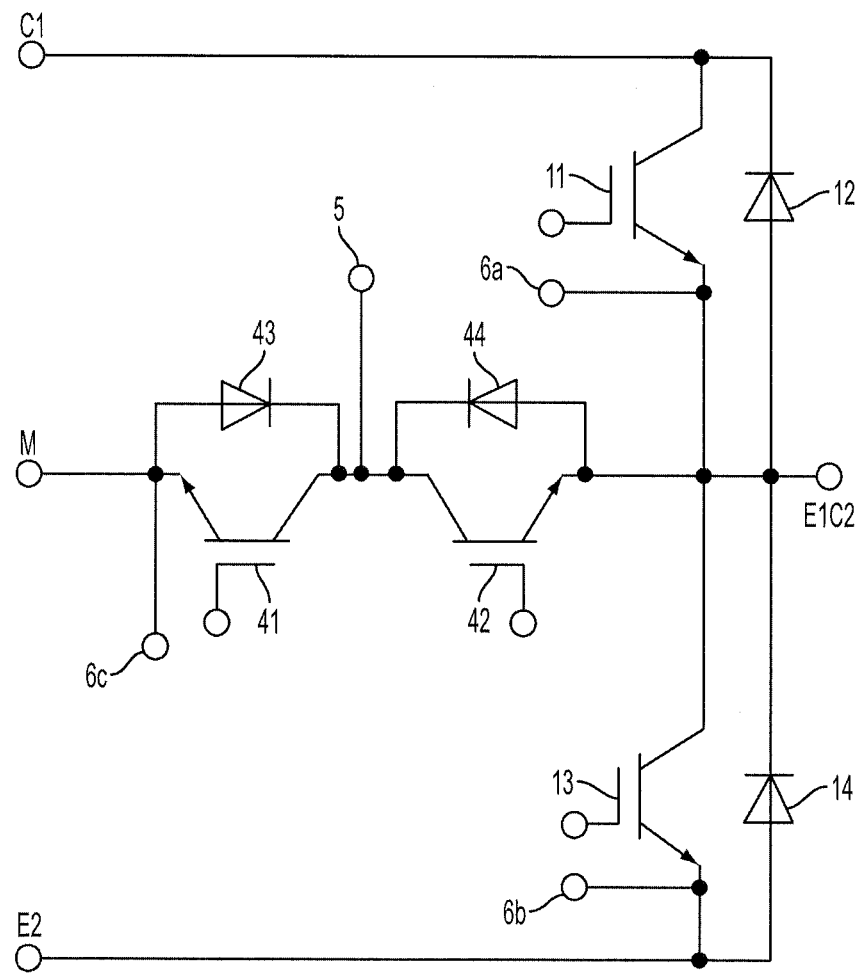
FIG. 1 is a circuit diagram illustrating a semiconductor device according to a first embodiment.

Hereinafter, semiconductor devices according to exemplary embodiments of the invention will be described in detail with reference to the accompanying drawings. In the following embodiments and drawings, the same components are denoted by the same reference numerals and a description thereof will not be repeated.

Figure 5A:
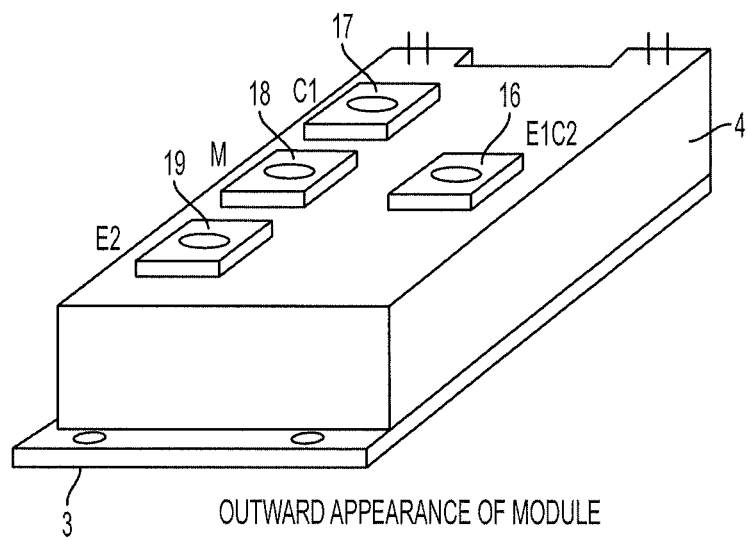
FIGS. 5A and 5B are diagrams illustrating the structure of a semiconductor device according to the related art.
Figure 5B:
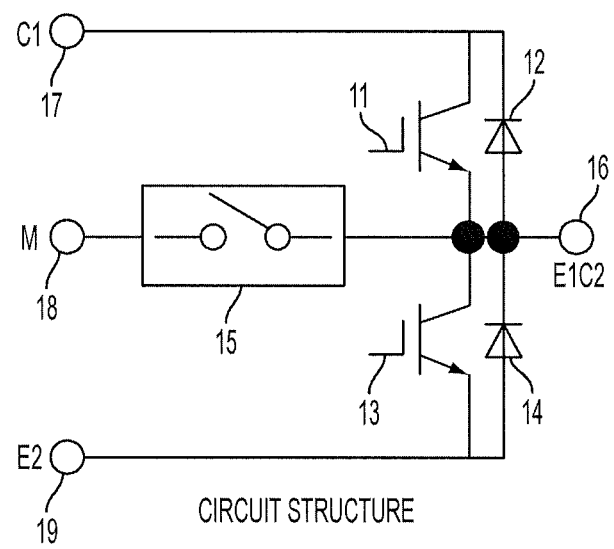
Figure 6A:
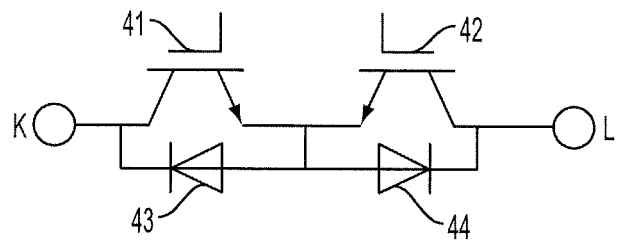
FIGS. 6A to 6C are circuit diagrams illustrating an AC switch according to the related art.
Figure 6B:
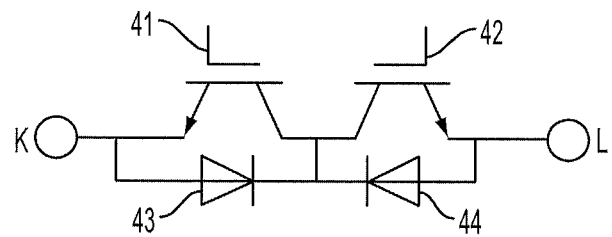
Figure 6C:
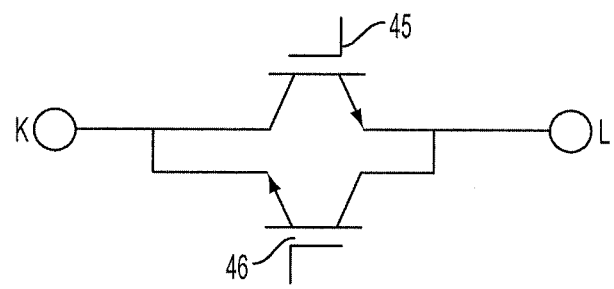
Figure 7A:
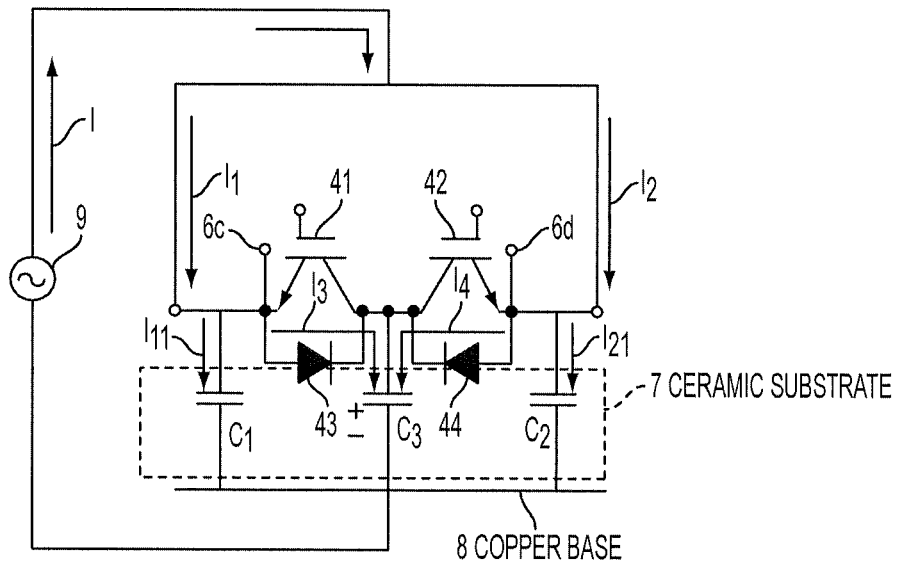
FIGS. 7A and 7B are circuit diagrams illustrating the insulation test according to the related art.
Figure 7B:
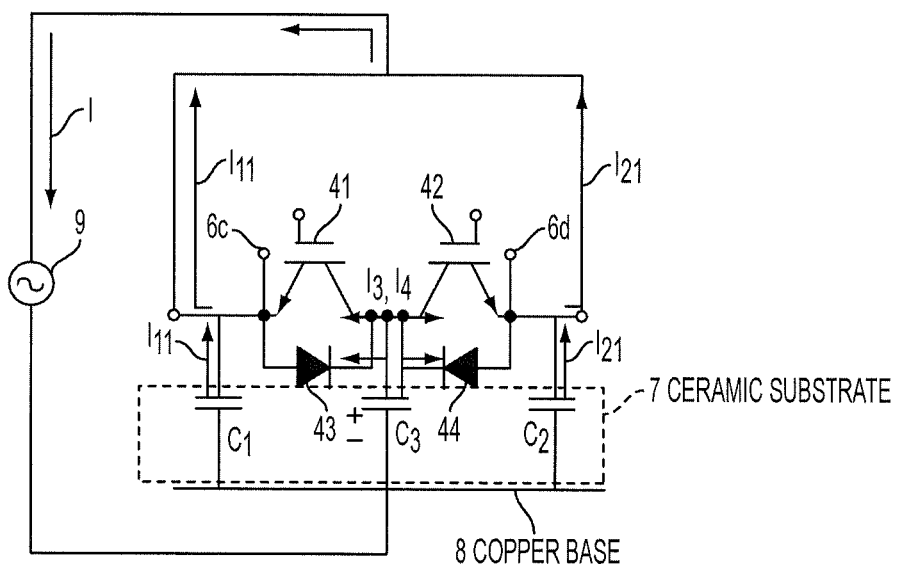

FIG. 1 is a circuit diagram illustrating a semiconductor device according to a first embodiment and corresponds to FIG. 5B. The semiconductor device shown in FIG. 1 differs from that shown in FIG. 5B in that an AC switch 15 is configured by connecting a collector of an IGBT 41 to which a diode 43 is connected in reverse parallel and a collector of an IGBT 42 to which a diode 44 is connected in reverse parallel and an intermediate terminal 5 is provided between the collector of the IGBT 41 and the collector of the IGBT 42. When a current flows from a terminal M to a terminal E1C2, the IGBT 42 is turned on and the current flows through a path from the diode 43 to the IGBT 42. When a current flows from the terminal E1C2 to the terminal M, the IGBT 41 is turned on and the current flows through a path from the diode 44 to the IGBT 41. An operation for the flow of the current is the same as that in the circuit diagram of FIG. 5B. An IGBT 11, an IGBT 13, and the IGBT 41 have the auxiliary emitters 6a, 6b, and 6c, respectively. The auxiliary emitter of the IGBT 42 is not provided since the auxiliary emitter 6a of the IGBT 11 also serves as the auxiliary emitter of the IGBT 42. A semiconductor device may be formed by integrating the circuit structure shown in FIG. 1 into a module corresponding to one phase. In addition, a semiconductor device may be formed by integrating a plurality of circuit structures shown in FIG. 1, each corresponding to one phase, for example, into, one module corresponding to three phases.

Figure 2A:
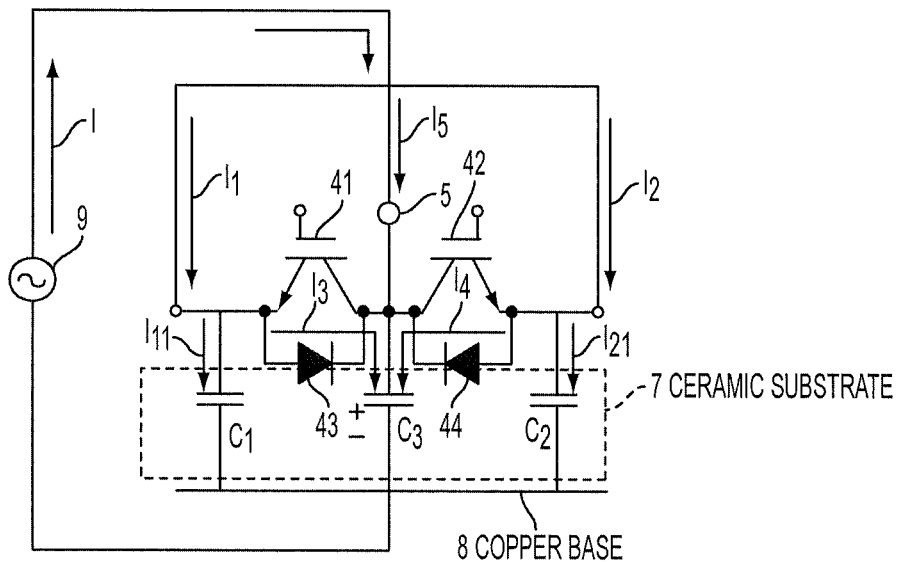
FIGS. 2A and 2B are circuit diagrams illustrating the test state of the semiconductor device according to the first embodiment.
Figure 2B:
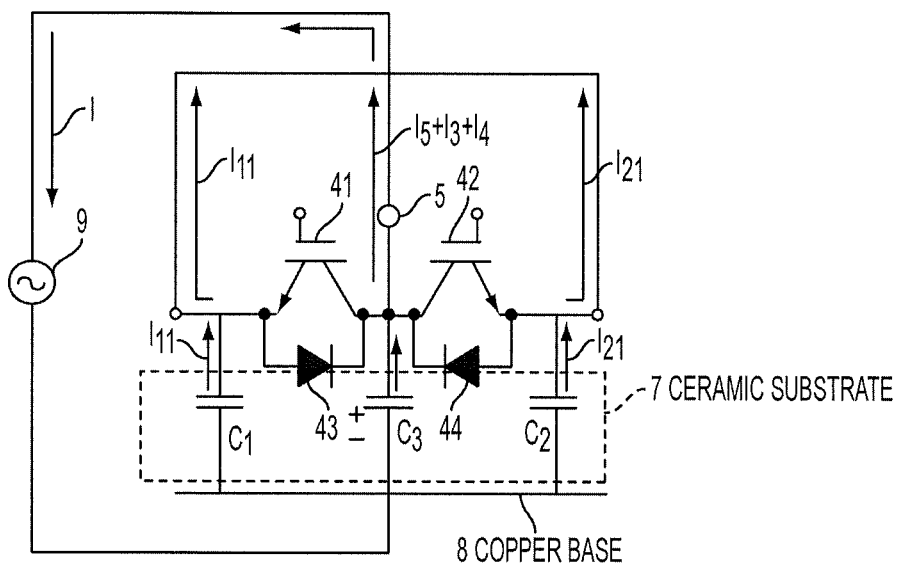

Next, an insulation test performed upon completion of the semiconductor device will be described. FIGS. 2A and 2B are circuit diagrams illustrating a portion of the test for checking electrical insulation between a semiconductor element in a module and metal on the rear surface of a base substrate 3. In the test, the main terminal of the module and terminals, such as control terminals, protruding to the outside of the module are connected to one terminal of an AC power supply 9, and the metal exposed from the rear surface of the base substrate 3 is connected to the other terminal of the AC power supply. Then, for example, a voltage of 3.0 kV is applied to check the electrical insulation between the semiconductor element in the module and the metal on the rear surface of the base substrate 3. FIGS. 2A and 2B show only the IGBT 41, the IGBT 42, the diode 43, and the diode 44 forming the AC switch in the circuit structure shown in FIG. 1. However, the test is similarly performed on the IGBT 11, the IGBT 13, the diode 12, and the diode 14. The insulation test will be described with reference to FIGS. 2A and 2B. FIGS. 2A and 2B show an example in which a ceramic substrate 7 on a copper base 8 is used as a base substrate. As shown in FIG. 2A, when the AC power supply 9 supplies a current I and a positive voltage is applied to the terminal, charge is stored between a circuit pattern (not shown) on the ceramic substrate 7 (represented by a dotted line) and the copper base 8 on the rear surface of the ceramic substrate 7. In this case, the following three charges are stored between the circuit pattern of the ceramic substrate 7 and the copper base 8. A charge $Q_1$ that is stored by a charging current $I_{11}$, part of a current $I_1$, in a capacitive component $C_1$ between the emitter of the IGBT 41 and the copper base; a charge $Q_2$ that is stored by a charging current $I_{21}$, part of a current $I_2$, in a capacitive component $C_2$ between the emitter of the IGBT 42 and the copper base; and a charge $Q_3$ that is stored in a capacitive component $C_3$ between the cathode and the copper base by a charging current $I_3+I_4+I_5$ obtained by a current $I_3$ flowing across the diode 43, a current $I_4$ flowing across the diode 44, and a current $I_5$ flowing across the intermediate terminal 5.

Then, as shown in FIG. 2B, when the voltage applied from the AC power supply 9 is reduced, the charge stored in the ceramic substrate 7 is discharged. At that time, the discharging currents $I_{11}$ and $I_{21}$ generated by the charges $Q_1$ and $Q_2$ stored in the capacitive components $C_1$ and $C_2$ between the emitters of the IGBTs 41 and 42 and the copper base, flow to the AC power supply. In addition, the discharging current $I_3+I_4+I_5$ generated by the charge $Q_3$ stored in the capacitive component $C_3$ between the collector and the copper base, flows to the AC power supply through the intermediate terminal 5. As such, the charge $Q_3$ stored in the capacitive component $C_3$ between the collector and the copper base is completely discharged. Therefore, there is no large potential difference between the collector and the emitter of the IGBTs 41 and 42. As a result, the damage to the IGBTs 41 and 42 is prevented.

In FIG. 1, since the intermediate terminal 5 is provided between the collector of the IGBT 41 and the collector of the IGBT 42, it is possible to individually measure the element characteristics of the IGBT 41, the diode 44, the IGBT 42, and the diode 43. Therefore, it is possible to evaluate the individual elements and clear up the cause of a defect.

Figure 3:
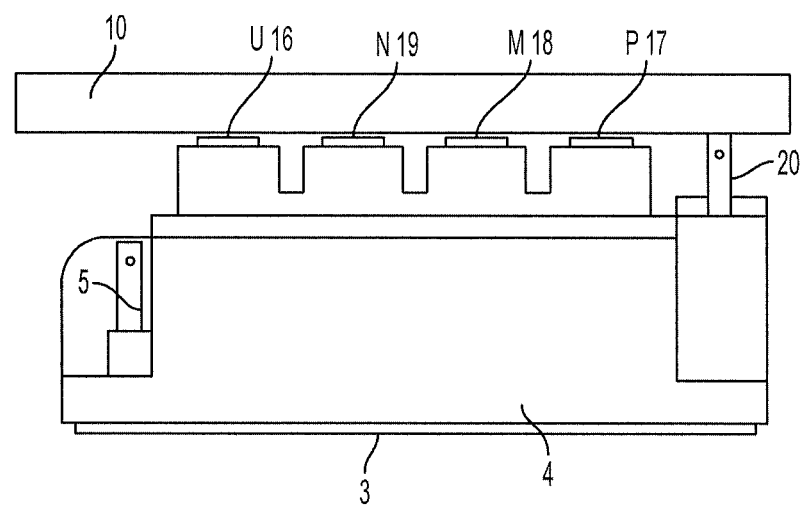
FIG. 3 is a side view illustrating the semiconductor device according to the first embodiment.
Figure 4:
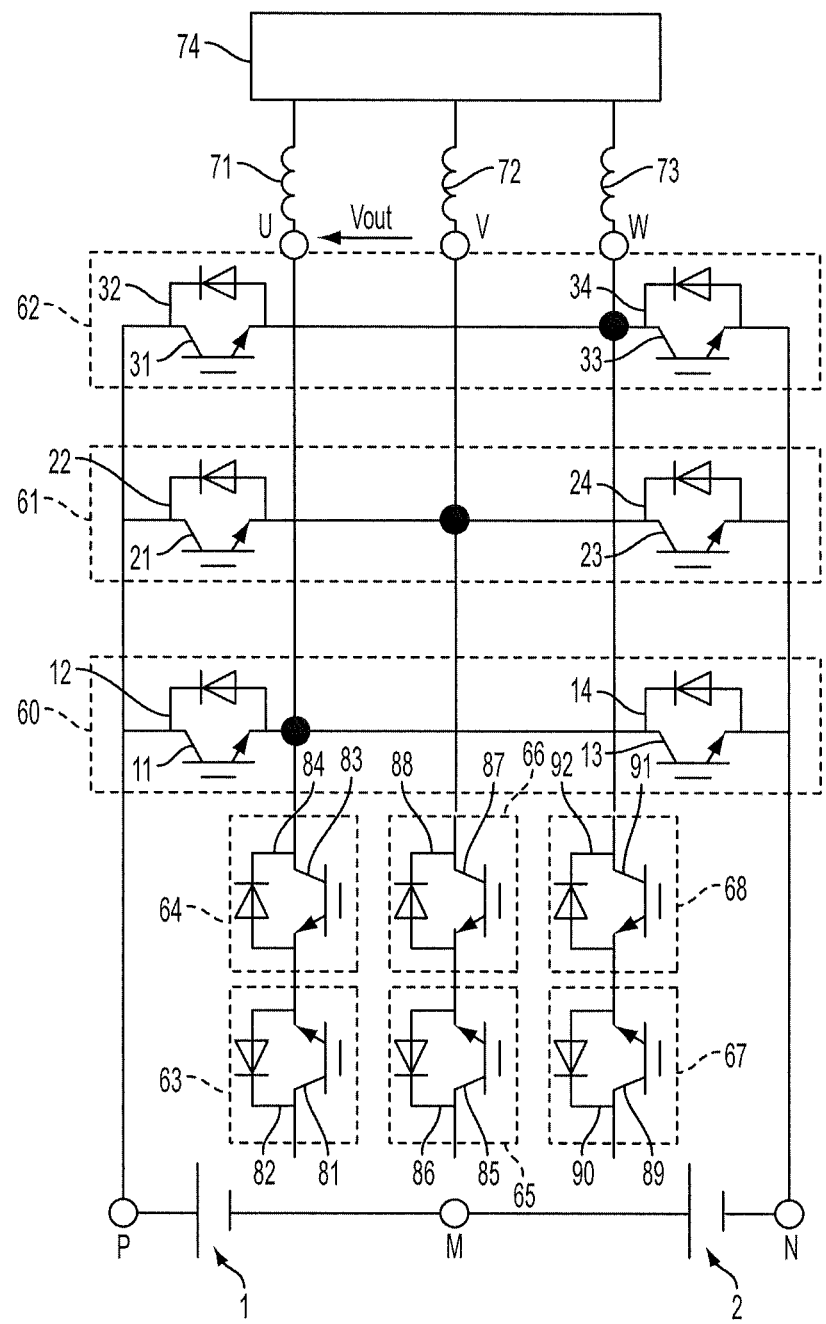
FIG. 4 is a circuit diagram illustrating a three-level inverter according to the related art.

FIG. 3 is a cross-sectional view illustrating the state of the semiconductor device when the semiconductor device is used as an inverter. In FIG. 3, a metal base substrate 3 allows a semiconductor element or a wiring member to be arranged thereon so as to be insulated. The metal base substrate 3 also has a function of transferring heat generated from the inside to a cooling fan. Any of the following substrates, for example, may be used as the base substrate 3: an aluminum insulating substrate having an insulating layer formed on an aluminum plate; a substrate in which, for example, an alumina or aluminum nitride ceramic substrate having metal foil, such as copper foil, bonded thereto is mounted on a copper or alloy plate; and a ceramic substrate that has metal foil bonded thereto without a copper or alloy plate. A U terminal 16, which is the terminal E1C2 serving as the main terminal for a U phase, an N terminal 19, which is the main terminal E2 at a negative potential N, an M terminal 18, which is the main terminal M at a neutral potential M, and a P terminal 17, which is the main terminal C1 at a positive potential P, are arranged in a line in this order on the upper surface of an insulating case 4 of the module. The terminal 20 of the auxiliary emitter and the gate is provided on one side of the P terminal 17 of the insulating case 4. A wiring substrate 10 is used to connect, for example, a control circuit. A bus bar or an electric wire other than the wiring substrate 10 may be used to connect the control circuit. The intermediate terminal 5 is arranged below the main terminal and the terminal 20 on the other side of the insulating case 4. When the terminals of the semiconductor device are arranged in this way, the following effects are obtained. First, since the N terminal 19, the M terminal 18, and the P terminal 17 are arranged in this order, it is easy to connect capacitors between the N terminal 19 and the M terminal 18 and between the M terminal 18 and the P terminal 17. Since the U terminal 16 is separated from the terminal 20, it is possible to reduce the influence of the main current flowing through the output terminal on the terminal 20. Since the intermediate terminal 5 is arranged below the main terminals and the terminal 20, it does not interfere with connection in the wiring substrate 10. In addition, the main terminals, the terminal 20, and the intermediate terminal 5 satisfy an insulation distance from the ground defined by an insulation standard, and the terminal 20 and the intermediate terminal 5 are smaller than the main terminals.

As described above, the semiconductor device according to the embodiment of the invention is configured by integrating a series-connected circuit and an AC switch into one module. The series-connected circuit is formed by connecting two IGBTs to which diodes are connected in reverse parallel in series. The AC switch is formed by connecting two IGBTs to which diodes are connected in reverse parallel in series such that the two IGBTs share the collector. Therefore, the semiconductor device can be applied to, for example, a three-level inverter circuit, a three-level converter circuit, and a resonant circuit.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A semiconductor device that is applied to a three-level voltage-type inverter, comprising:
   a first IGBT to which a diode is connected in reverse parallel and which has a collector connected to a positive terminal of a DC circuit;
   a second IGBT to which a diode is connected in reverse parallel and which has an emitter connected to a negative terminal of the DC circuit; and
   an AC switch that is connected between a connection point between an emitter of the first IGBT and a collector of the second IGBT and a neutral terminal between the positive terminal and the negative terminal of the DC circuit,
   wherein the first IGBT, the second IGBT, and the AC switch are accommodated in one package,
   the AC switch is formed by connecting a collector of a third IGBT to which a diode is connected in reverse parallel and a collector of a fourth IGBT to which a diode is connected in reverse parallel, and
   an intermediate terminal is provided between the collector of the third IGBT and the collector of the fourth IGBT,
   the intermediate terminal is configured and arranged to connect to a component outside of the package containing the first IGBT, the second IGBT, and the AC switch, and
   the intermediate terminal has a portion that is exposed to outside of the package.

2. The semiconductor device according to claim 1,
   wherein the first to fourth IGBTs to each of which one of the diodes is connected in reverse parallel form a switching circuit corresponding to one phase, and
   a plurality of the switching circuits each corresponding to one phase is accommodated in one package.

3. The semiconductor device according to claim 1,
   wherein each of the first to fourth IGBTs has a terminal of an auxiliary emitter.

4. The semiconductor device according to claim 2,
   wherein each of the first to fourth IGBTs has a terminal of an auxiliary emitter.

5. The semiconductor device according to claim 3,
   wherein, among the first to fourth IGBTs, the IGBTs having the emitters at the same potential share the terminal of the auxiliary emitter.

6. The semiconductor device according to claim 4,
   wherein, among the first to fourth IGBTs, the IGBTs having the emitters at the same potential share the terminal of the auxiliary emitter.

7. The semiconductor device according to claim 1,
   wherein the collector of the first IGBT, the emitter of the second IGBT, and the neutral terminal are main terminals, and
   the intermediate terminal and the gates and the auxiliary emitters of the first to fourth IGBTs are terminals smaller than the main terminals.

8. The semiconductor device according to claim 2,
wherein the collector of the first IGBT, the emitter of the second IGBT, and the neutral terminal are main terminals, and
the intermediate terminal and the gates and the auxiliary emitters of the first to fourth IGBTs are terminals smaller than the main terminals.

9. The semiconductor device according to claim 3,
wherein the collector of the first IGBT, the emitter of the second IGBT, and the neutral terminal are main terminals, and
the intermediate terminal and the gates and the auxiliary emitters of the first to fourth IGBTs are terminals smaller than the main terminals.

10. The semiconductor device according to claim 4,
wherein the collector of the first IGBT, the emitter of the second IGBT, and the neutral terminal are main terminals, and
the intermediate terminal and the gates and the auxiliary emitters of the first to fourth IGBTs are terminals smaller than the main terminals.

11. The semiconductor device according to claim 5,
wherein the collector of the first IGBT, the emitter of the second IGBT, and the neutral terminal are main terminals, and
the intermediate terminal and the gates and the auxiliary emitters of the first to fourth IGBTs are terminals smaller than the main terminals.

12. The semiconductor device according to claim 6,
wherein the collector of the first IGBT, the emitter of the second IGBT, and the neutral terminal are main terminals, and
the intermediate terminal and the gates and the auxiliary emitters of the first to fourth IGBTs are terminals smaller than the main terminals.

13. The semiconductor device according to claim 7,
wherein the intermediate terminal is arranged below the main terminal, and the terminals of the gates and the auxiliary emitters.

14. The semiconductor device according to claim 8,
wherein the intermediate terminal is arranged below the main terminal, and the terminals of the gates and the auxiliary emitters.

15. The semiconductor device according to claim 9,
wherein the intermediate terminal is arranged below the main terminal, and the terminals of the gates and the auxiliary emitters.

16. The semiconductor device according to claim 10,
wherein the intermediate terminal is arranged below the main terminal, and the terminals of the gates and the auxiliary emitters.

17. The semiconductor device according to claim 11,
wherein the intermediate terminal is arranged below the main terminal, and the terminals of the gates and the auxiliary emitters.

18. The semiconductor device according to claim 12,
wherein the intermediate terminal is arranged below the main terminal, and the terminals of the gates and the auxiliary emitters.

19. The semiconductor device according to claim 1,
wherein the intermediate terminal is connected to a capacitor and is configured to connect to an AC power source.

20. The semiconductor device according to claim 1, wherein
the intermediate terminal is connected to a first capacitor,
the third IGBT has an emitter connected to a second capacitor,
the fourth IGBT has an emitter connected to a third capacitor,
the first, second, and third capacitors are connected to each other in parallel, and
the intermediate terminal is configured to connect to an AC power source.

21. The semiconductor device according to claim 18, wherein
the main terminal, the terminals of the gates, and the terminals of the auxiliary emitters are each exposed to outside of the package on an upper side of the package, and
the portion of the intermediate terminal exposed to the outside is recessed from the upper side of the package.

22. A semiconductor device that is applied to a three-level voltage-type inverter, comprising:
a first IGBT to which a diode is connected in reverse parallel and which has a collector connected to a positive terminal of a DC circuit;
a second IGBT to which a diode is connected in reverse parallel and which has an emitter connected to a negative terminal of the DC circuit; and
an AC switch that is connected between a connection point between an emitter of the first IGBT and a collector of the second IGBT and a neutral terminal between the positive terminal and the negative terminal of the DC circuit,
wherein the first IGBT, the second IGBT, and the AC switch are accommodated in one package,
the AC switch is formed by connecting a collector of a third IGBT to which a diode is connected in reverse parallel and a collector of a fourth IGBT to which a diode is connected in reverse parallel,
an intermediate terminal is provided between the collector of the third IGBT and the collector of the fourth IGBT,
the intermediate terminal is connected to a first capacitor,
the third IGBT has an emitter connected to a second capacitor,
the fourth IGBT has an emitter connected to a third capacitor,
the first, second, and third capacitors are connected to each other in parallel, and
the intermediate terminal is configured to connect to an AC power source.

* * * * *